Aug. 29, 1967   R. B. REMICK, JR., ET AL   3,338,099
BOILING POINT INDICATOR
Filed Oct. 23, 1965

INVENTOR.
RALPH B. REMICK
BY HARRY J. VAN KUYK
TENNES I. ERSTAD
JOHN E. MC RAE

United States Patent Office 3,338,099
Patented Aug. 29, 1967

3,338,099
BOILING POINT INDICATOR
Ralph B. Remick, Jr., Detroit, and Harry J. Van Kuyk, Franklin, Mich., assignors to American Radiator & Standard Sanitary Corporation, New York, N.Y., a corporation of Delaware
Filed Oct. 23, 1965, Ser. No. 503,763
7 Claims. (Cl. 73—345)

ABSTRACT OF THE DISCLOSURE

The present invention proposes a safe-unsafe temperature indicator for an engine cooling system, wherein two sensors are employed. One sensor responds to coolant temperature, and the other sensor responds to coolant pressure. The two sensors mechanically operate a single movable output member (diaphragm), which in turn operates a pointer or similar indicator element to furnish visual indication of safe or unsafe operating temperatures, as influenced by coolant system pressure.

This invention relates to boiling point indicators for coolants in engine cooling systems.

Many engine cooling systems comprise liquid coolant passages around or through the engine, a thermostatic control valve arranged to intercept the coolant as it leaves the engine, an air-cooled radiator for cooling the coolant after it has passed through the thermostatic control valve, and a pump for returning the cooled coolant to the engine. The radiator is usually provided with a liquid fill opening which may be closed by a cap having a pressure relief valve therein set to open at some specific internal pressure, for example twelve p.s.i.

The pressure in any one system or groups of systems may vary from the highest possible value of twelve pounds gage down to a much lower value, for example six pounds or less. The variation in operating pressure may be due to a multitude of factors, including the barometric pressure, leaks in the system, and the amount of coolant in the system. Such operating pressure variances cause different liquid coolant systems to have different boiling points. In a highly pressurized system the coolant will boil at a higher temperature than will the same coolant in a less pressurized system.

When the heat load and engine load are high it is desirable to operate the engine at as high a temperature as possible without boiling off the coolant. The highly pressurized systems can be operated at higher maximum safe temperatures than the lower pressure systems. An object of the present invention is to provide a boiling point indicator for coolants which will take into account the pressure of the system, thus enabling the engine to be operated at temperatures which are safely below the coolant boiling point whether the boiling point is relatively low or relatively high.

Figure 1:
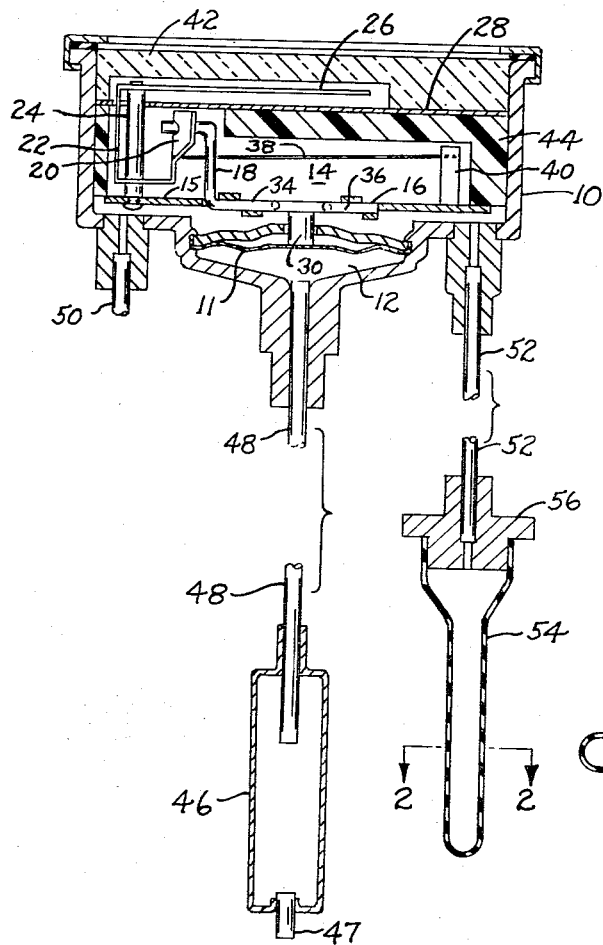
FIGURE 1 is a sectional view of a boiling point indicator constructed according to the invention.
Figure 2:
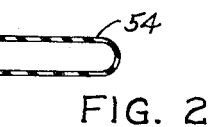
FIG. 2 is a sectional view taken on line 2—2 in FIG. 1.

The drawing shows a gauge comprising a cylindrical casing 10 having a lower chamber 12 and an upper chamber 14. The gauge is similar to that shown in FIG. 1 and FIG. 2 of U.S. Patent 3,068,702. Adjustably disposed within chamber 14 is a plate 15 which mounts a crank 16 having an upstanding arm portion 18. Engaged with the laterally turned end of arm portion 18 is an upstanding notched plate 20 formed as part of a lever 22, said lever having aligned apertures in its upper and lower wall portions for its rotary mounting on an upstanding post 24 carried by plate 15. Suitable rivets (not shown) mount plate 15 in its illustrated position, all as shown in aforementioned Patent 3,068,702.

Laterally extending portion 26 of lever 22 serves as a pointer for cooperation with scale plate 28 in providing a visual indication of the deflection of diaphragm 11. Thus, upward deflection of diaphragm 11 acts through stud 30 to pivot crank 16 about the axis defined by the journaled crank portions 34 and 36. The crank thus rotates lever 22 about the axis of post 24 and imparts arcuate movement to pointer 26. A lightly tensioned wire 38 trained between fixed arm 40 and lever 22 may be used to maintain the notched portion of the lever in continual engagement with the laterally turned end of the crank.

The illustrated gauge includes a transparent bezel 42 closing the upper chamber 14, and a molded plastic filler block 44 within the upper chamber to take up as much free space as possible without interfering with operative movement of crank 16, lever 22, or adjustable plate 15. Chamber 14 is a sealed chamber filled with liquid; by reducing the chamber volume we reduce the liquid expansion or contraction due to the gauge being subjected to different ambient temperature conditions.

In service, gauge casing 10 can be located on the instrument panel of a tractor or other vehicle on which it is to be used. A thermal bulb 46 may be connected with chamber 12 of the gauge casing by means of capillary tubing 48. The system defined by chamber 12, capillary 48 and bulb 46 is precharged through fill tube 47 with a suitable liquid having a temperature vapor pressure curve with the same slope in the interested temperature range as the vapor pressure curve of the coolant used in the engine cooling system. For example, with conventional water-antifreeze coolants the bulb system can be charged with a solution consisting of two parts N-propyl alcohol and one part isobutyl alcohol.

The charging may be accomplished for example by first applying a vacuum on the bulb and chamber 12 through tube 47, then removing the vacuum and simultaneously connecting fill tube 47 with a supply of the charging liquid to cause a predetermined liquid quantity to be introduced into the bulb, and then sealing the fill tube. Enough liquid is introduced so that some liquid will always be in bulb 46 irrespective of the relative heights of the gauge casing and bulb. In use, the bulb may be positioned in the coolant stream leaving the engine. Thus, as the engine warms up the vapor pressure of the liquid in the bulb system increases and acts against the underside of diaphragm 11.

As previously noted, the chamber above diaphragm 11 is filled with liquid. This chamber communicates with a capillary 52 and with a deformable liquid housing defined by rubber sack or bag 54 and mounting block 56. Liquid can be charged into chamber 14 and cylindrical bag 54 through a fill tube 50. This may be accomplished by first applying a vacuum on fill tube 50, then connecting the fill tube to a source of liquid supply to allow the vacuum to draw the liquid into chamber 14, capillary 52, and bag 54. The fill tube can then be sealed to retain the liquid charge. The liquid may be charged at room temperature with the bag in a partially collapsed condition as shown. During the charging operation the bag may be retained in a fixture having a bag-receiving pocket conforming to the desired bag outline.

Various liquids could presumably be used as the filling substance for the system defined by chamber 14, capillary 52 and bag 54. However, the liquid should act only as a pressure-transmitting mechanism and should therefore have a low vapor pressure and fairly shallow liquid expansion curve; additionally it should remain chemically stable and relatively nonviscous over the operating temperatures to which it is exposed. In the illustrated system the liquid in chamber 14 fills the space surrounding pointer 26 and thus is visible through bezel 42; therefore the liquid should be colorless. We have found that a suitable liquid is polysiloxane having a viscosity of about ten centistokes taken at 25° C. Another suitable liquid is a solution of ethylene glycol and water.

In use of the gauge, rubber bag 54 may be mounted in a horizontal or vertical position in the upper portion of the engine radiator. When the pressure in the radiator corresponds to normal atmospheric pressure the pressure above diaphragm 11 will exert a fairly small force on the diaphragm. As the engine heats up the cooling system pressure will increase due to increasing coolant vapor pressure, coolant expansion, and pump pressure. Depending on the presence of leaks and coolant liquid level, the pressure in the radiator may go as high as twelve pounds gage, at which point the conventional pressure relief valve vents to atmosphere. As the radiator pressure increases it acts on the outer surface of bag 54, causing the bag to contract. The polysiloxane transmits the bag contraction onto diaphragm 11. Assuming a perfect system, the increase in pressure on the upper face of the diaphragm will be equal to the increase in vapor pressure in the cooling system radiator.

The liquid volume in chamber 14 may by design of the gauge be greater than the volume of bag 54. Hence, ambient temperature changes at casing 10 can have a decided tendency to expand or contract the rubber bag, since the liquid volume change is reflected along the capillary 52 to the bag interior. The bag dimension and state of contraction is initially chosen such that the bag will always have some liquid reserve irrespective of the temperatures existing at the gage casing. Of course the reserve can be less when a charging liquid having a low coefficient of thermal expansion is used. The bag should never become so filled as to begin stretching since this would put work into the bag which would be reflected as a false pressure increase on the upper face of diaphragm 11. The desired action is one wherein the bag merely transmits the radiator pressure to the polysiloxane fill, which in turn applies the pressure to diaphragm 11.

As the engine heats up from a cold condition the increasing coolant temperature surrounding bulb 46 provides an increasing upward force on diaphragm 11. Conversely, any increase in radiator pressure is reflected in an increasing downward force on diaphragm 11 via the liquid in sack 54. The resultant diaphragm deflection is thus dependent not only on the coolant temperature as it leaves the engine but also on the cooling system pressure at the radiator.

As higher radiator pressures the coolant has a higher boiling point, which permits the engine to be operated in a more heavily loaded manner without boiling off the coolant. Thus, water at atmospheric pressure will boil at 212° F., while water at twelve pounds gage will boil at about 243° F. Using the illustrated gage we are able to obtain a motion of pointer 26 which reflects the safe coolant temperature range, irrespective of the pressure in the system. Thus, the scale plate 28 can be simply marked with a green band denoting safe coolant conditions and a red band denoting unsafe coolant conditions. The pointer position then is a function of a combination of radiator pressure and coolant temperature. A single pointer can thus be used to indicate the boiling point of the coolant with various different coolant pressures.

In using the described boiling point indicator the driver of the tractor or other vehicle can operate his engine in accordance with the conditions observed from plate 28. Thus, should the pointer move into the red danger band the driver can reduce the load on the engine, and/or operate auxiliary radiator fans or air shutters, all as may be available to him on the vehicle.

It will be appreciated that variations in the structure of the indicator may be resorted to while still practicing the invention. Thus, within the broader aspects of the invention the rubber sack 54 may be eliminated. With such an arrangement tube 52 would sense radiator pressure and transmit pressure variations to the upper side of diaphragm 11. The rubber sack and polysiloxane fill are however advantageous in sealing tube 52 from the radiator interior. With an open-ended tube 52, under certain conditions moisture could collect in tube 52 and freeze, thus plugging the tube and causing the gauge to give a false reading at the dial plate.

Diaphragm 11 could conceivably be replaced by Bourbon tubes communicating with capillaries 48 and 52. The Bourbon tube arrangement would of course require different types of connections with the indicator than that shown in the drawing.

The radiator is believed to be the best location for the pressure sensing mechanism since it is conveniently accessible and provides a free space which reflects the static pressure of the system apart from liquid velocity pressure effects existing at other locations in the system.

The novel features of the invention are pointed out in the accompanying claims.

It is claimed:

1. In an engine cooling system having a coolant passage defined in part by a radiator; a fluid-charged bulb located to respond to the temperature of the coolant when heated by the engine; a temperature gauge comprising a casing located remote from the bulb and cooling system, said casing having pressure-deflectable wall means subdividing same into first and second fluid chambers having inversely varying volumes; a fluid transmission tube extending from the bulb into the first chamber whereby an increasing engine temperature tends to cause the deflectable wall means to move in the direction which expands the first chamber; means, including a second fluid transmission tube, for applying the static pressure existing within the coolant passage to the fluid within the second chamber, whereby an increasing static pressure in the coolant passage tends to cause the deflectable wall means to move in the direction which expands the second chamber; and indicator means operatively connected with the deflectable wall means for denoting the magnitude of its movement, said indicator means being located within the second chamber of the casing.

2. The combination of claim 1 wherein the pressure-applying means comprises a deformable liquid housing arranged with its external surface exposed to the radiator, the aforementioned second tube connecting the liquid housing and second chamber, and a liquid filling the system defined by the second chamber, second tube and liquid housing.

3. The combination of claim 2 wherein the liquid housing comprises a bag having the characteristic of being collapsed and expanded with substantially no work effort.

4. The combination of claim 3 wherein the bag is a rubber bag pre-formed with a cylindrical cross section; said bag, second tube and second chamber being charged with liquid while under vacuum and the bag held in a partially collapsed distorted condition, whereby the liquid can expand without stretching the rubber bag or contract without evacuating the rubber bag.

5. The combination of claim 1 wherein the pressure-applying means comprises the aforementioned second tube connected between the second chamber and the radiator, and polysiloxane liquid filling the system comprised of the second chamber and second tube.

6. The combination of claim 1 wherein the deformable wall means comprises a single corrugated metal diaphragm, and the indicator means comprises a fixed dial plate and overlying pointer mounted for rotary movement; said pointer being operatively connected with the diaphragm by a crank positioned in the second chamber.

7. The combination of claim 6 and further comprising solid filler means occupying a major part of the second chamber volume without interfering with operative movements of the crank and pointer; said filler means being operable to substantially reduce the quantity of liquid which would otherwise be necessary to fill the second chamber.

References Cited

UNITED STATES PATENTS

| | | | |
|---|---|---|---|
| 2,244,335 | 6/1941 | Hopkins | 73—406 |
| 2,431,801 | 12/1947 | Gigson | 73—345 |
| 2,601,777 | 7/1952 | Woodward | 73—345 |
| 2,662,757 | 12/1953 | Muck | 73—345 |
| 3,083,576 | 4/1963 | Kanes | 73—409 |

FOREIGN PATENTS 637,471  10/1936  Germany.

LOUIS R. PRINCE, *Primary Examiner.*

N. B. SIEGEL, *Examiner.*